July 15, 1958 G. E. NIGHTHART 2,843,178
APPARATUS FOR CORRECTING THE CONTOUR OF
EXTRUDER OR ROLLED SECTIONS
Filed Sept. 11, 1956 7 Sheets-Sheet 1

Fig. 1

INVENTOR.
GEORGE E. NIGHTHART
BY
Brown, Critchlow, Flick &
Peckham
HIS ATTORNEYS

INVENTOR.
GEORGE E. NIGHTHART
BY
His ATTORNEYS

July 15, 1958

G. E. NIGHTHART 2,843,178

APPARATUS FOR CORRECTING THE CONTOUR OF
EXTRUDER OR ROLLED SECTIONS

Filed Sept. 11, 1956

INVENTOR.
GEORGE E. NIGHTHART
BY
Brown, Critchlow, Flick & Peckham
HIS ATTORNEYS July 15, 1958 — G. E. NIGHTHART — 2,843,178
APPARATUS FOR CORRECTING THE CONTOUR OF
EXTRUDER OR ROLLED SECTIONS
Filed Sept. 11, 1956 — 7 Sheets-Sheet 5

INVENTOR.
GEORGE E. NIGHTHART
BY
Brown, Critchlow, Flick & Peckham
HIS ATTORNEYS July 15, 1958    G. E. NIGHTHART    2,843,178
APPARATUS FOR CORRECTING THE CONTOUR OF
EXTRUDER OR ROLLED SECTIONS
Filed Sept. 11, 1956    7 Sheets-Sheet 7

INVENTOR.
GEORGE E. NIGHTHART
BY
Brown, Critchlow, Flick & Peckham
HIS ATTORNEYS United States Patent Office 2,843,178
Patented July 15, 1958

2,843,178

APPARATUS FOR CORRECTING THE CONTOUR OF EXTRUDED OR ROLLED SECTIONS

George E. Nighthart, Lewistown, Pa., assignor to Sutton Engineering Company, a corporation of Pennsylvania Application September 11, 1956, Serial No. 609,137

14 Claims. (Cl. 153—54)

This invention relates to apparatus for correcting the contour of, or for recontouring, metal stock previously shaped by extrusion or rolling that has become distorted either during the forming process or in subsequent handling or heat treating, or that has not been initially formed to the desired ultimate shape due to inherent limitations of die or rolling equipment.

The present application is a continuation-in-part of an application similarly titled, Serial No. 534,287, filed September 14, 1955, and subsequently abandoned.

A large number of structural sections, made of relatively light ferrous or non-ferrous metals, frequently have cross sections of unusual and complex design. Such sections are generally formed by extrusion through suitable dies or, where the shape is less complex, in rolling mills. With some sections, the desired ultimate shape cannot be obtained by such methods, due to inherent limitations in die or rolling mill equipment. Even more frequent, however, are the crosswise distortions that occur in extruded or rolled sections, which were perfect when they left the die or mill, but become distorted later during heat treating, detwisting, stretching, or other handling operations. The resulting irregularity in the contour of their cross section is objectionable, since the defects may prevent proper fitment and assembly.

Heretofore, a number of methods have been used to correct such crosswise dimensional inaccuracies or distortions, including hammering the sections with the aid of suitable blocks, bending with make-shift hand levers or tools, or deforming on a light press with the aid of suitable blocks, until the defects are more or less removed; but this requires very skilled workmen, who can handle only a limited amount of material. In some cases, the sections are passed through a series of rolls, and are in effect rerolled to the desired contour; but this latter method is limited to sections that are capable of being rolled initially to the desired shape and to the less complex sections that can be initially formed only by extrusion. In addition, such rerolling equipment is very inflexible, requiring elaborate roll setups, using special rolls, for each particular section, and with no adequate provision for quickly changing the setup to handle different sections with a minimum number of roll changes.

It is accordingly among the objects of this invention to provide apparatus that will correct the contour of previously extruded or rolled sections in which crosswise distortions have developed either during the original extrusion or rolling process or subsequent thereto in heat treating and handling the material.

Another object of this invention is to provide apparatus that will alter or recontour to the desired ultimate shape such sections as have been previously extruded or rolled but, because of inherent die or rolling limitations, have not been formed to the desired ultimate shape.

A further object is to provide apparatus that will fulfill the foregoing objects and in addition will be capable of handling a large variety of sections of different configuration with a minimum number of tools, that will permit the maximum use of standardized tools and minimize the need for special tools, that will permit the continuous adjustment of the tools while they are in operation, that will minimize slippage on the material being worked to avoid scoring or marring the surface of the work, and that will provide for the quick and easy conversion from one tool setup to another for handling different sections with a minimum loss of time.

Other objects will be apparent from the following description of the invention in connection with the accompanying drawings, in which.

The apparatus in accordance with this invention includes at least one roll stand having a pair of housings and a pair of roll spindles journaled therein and extending therebetween. Each spindle is adapted to have adjustably and removably mounted thereon at least one working roll. Extending transversely between the housings is at least one cross member with a plurality of main cross heads slidably and adjustably mounted thereon. At least one separate cross rail also extends transversely between the housing on the exit side of the roll stand and a plurality of auxiliary cross heads are slidably and adjustably mounted on the cross rail. Means are provided for continuously adjusting the horizontal position of the cross heads on their supporting cross rail or cross member. Tool holders may be removably and adjustably mounted in the cross heads, each tool holder supporting a tool in the form of a roll or die having a working face of the desired configuration. The tool rolls supported by the main cross heads are adapted to have their axes in substantially the same vertical plane as the two spindle axes and to have their working faces oppose each other or the working face of a work roll on one of the spindles. As for the tool rolls supported by the auxiliary cross heads, their axes are adapted to lie in the same vertical plane, spaced however from the plane of the spindle axes and on the delivery side thereof, and their working faces are adapted to oppose each other. All of the tool rolls (or dies) may have their axes inclined at any desired angle to the horizontal. Means are provided for passing the material to be recontoured, or of which the contour is to be corrected, through a pass defined by two or more opposed tools or rolls supported on the roll stand.

Referring to Figs. 1–5, there are shown three roll stands 1, each stand including a pair of housings 2 slidably supported on rails 3, which in turn rest on an enclosed frame 4. In addition to the housings, each roll stand includes a lower spindle 6 and an upper spindle 7 journaled in the housings and extending therebetween. The upper spindle is mounted in a journal block 8, which is adjustable upwards and downwards by the usual screwdowns 9, operated by a hand wheel 10. Extending transversely through the housings of each roll stand are an upper cross member 11 and a lower cross member 12, each consisting of two parallel rods mounted in the housing adjacent the upper and lower spindles, respectively. Slidably supported on each pair of rods are two yokes 13, each yoke being integral with and part of a main cross head 14. These four main cross heads are separately identified by the letters A to D. The transverse position of each cross head may be continuously adjusted by the operator by means of separate adjusting screws 15, rotatably mounted in the housing and extending about to the center line of the roll stand. Each screw engages a threaded portion of the adjacent cross head, and permits each cross head to be moved to any position between one of the housings and the center line of the roll stand. When desired, the cross heads can be removed from the stand by removal of their supporting cross members.

Mounted on the exit side of the roll stand are an upper cross rail 20 and a lower cross rail 21. Slidably mounted thereon are a plurality of auxiliary cross heads 22, of which there are preferably four on each cross rail. These rails have an H-shaped cross section, as shown best in Fig. 4, and each cross head embraces one half of that cross section, so that two auxiliary cross heads may be mounted on one end of each cross rail and two on the other end, those on one end having sufficient clearance to pass each other when adjusting them along the cross rail. These auxiliary cross heads are further identified in the drawings by the letters E to L. Like the main cross heads, the auxiliary cross heads are each horizontally adjustable on their supporting cross rials between one of the housings and the center line of the mill stand by the adjusting screws 23, which operate in the same manner as previously described in connection with the adjusting screws 15 of the main cross heads.

Figure 4:
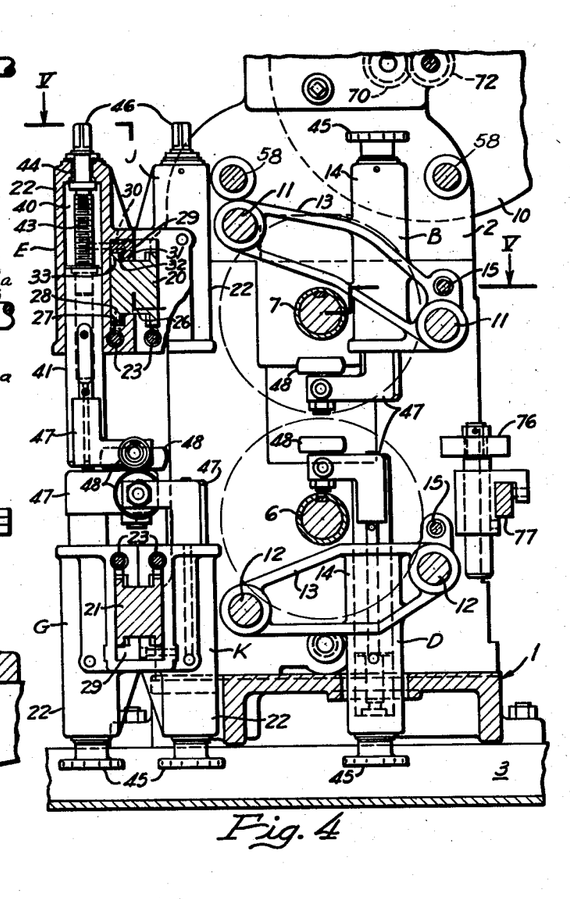
Fig. 4 is a side elevation, partly in section, along the line IV—IV in Fig. 3.

It is a feature of this invention that, while each cross rail and its supported cross heads are easily removed from the housings by removing the bolts 25 which secure the cross rails 20 and 21 to the housing 2, the auxiliary cross heads are independently removable. The construction that makes this possible is shown in Fig. 4 with reference to auxiliary cross head E. The bottom of this cross head is provided with a slot or groove 26, in which rests a bearing liner 27 that engages the downward projecting leg 28 on the outer side of the cross rail. The upper part of this cross head is provided with a similar, but non-integral, slot formed by a removable L-shaped liner 29 that is secured to the cross head by bolts 30. The downwardly extending leg or flange 31 of this L-shaped liner rests on the cross rail and is provided with a bearing liner 32 on one side which engages the upward extending leg 33 of the cross rail. The adjusting screw 23 for the cross head is rotatably supported on the cross rail 20 by a split collar 34 held on said cross rail by bolts 35 and also supported by an arm 54 secured to the end of the cross rail (see Fig. 3). When this collar is opened and this arm is removed, the adjusting screw may be withdrawn from the cross rail and from the cross head. The removable L-shaped liner 29 is then removed by loosening the bolts 30. The cross head will then drop on the cross rail a distance equal to the thickness of the liner so that the top of the slot 26 at the bottom of the cross head will fall below and clear the adjacent leg 28 of the cross rail, permitting the cross head to be slid off the rail to the left (looking at Fig. 4). A similar, but inverted, mounting is provided for the lower auxiliary cross heads G, H, K, and L, in which the L-shaped liner 29 is below the cross rail, thereby permitting the cross head to be lifted and removed from the cross rail after the liner has been removed.

Figure 5:
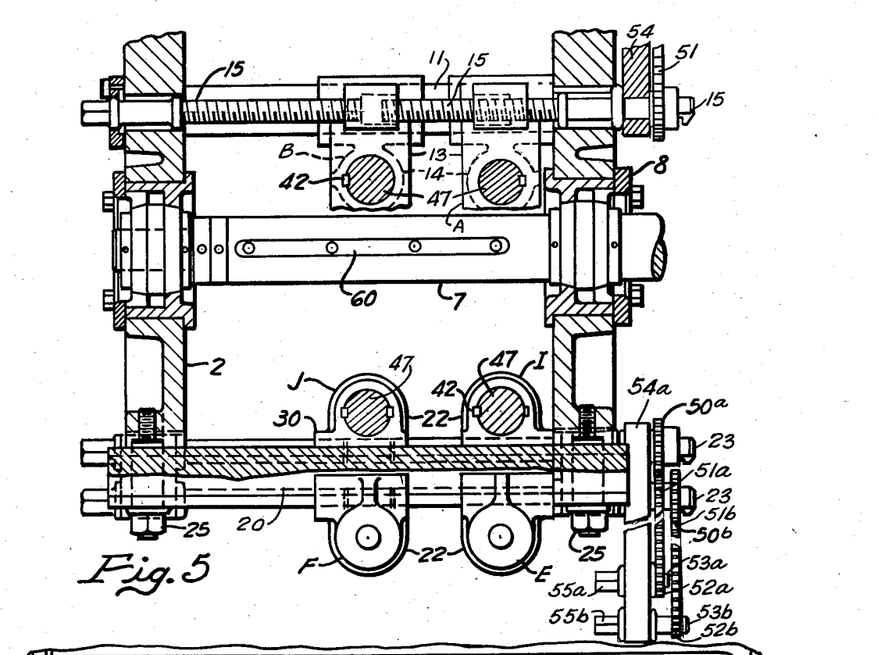
Fig. 5 is a plan view, partly in section, of one of the roll stands taken along the line V—V of Fig. 4.

Each of the main and auxiliary cross heads is provided with a vertically extending bore 40, in which is slidably telescoped a tool holder 41, which is secured against rotation by a key 42 (see Fig. 5). The tool holder is supported therein by an adjusting screw 43 rotatably mounted in the top of the cross head in a bearing 44. The upper ends of the adjusting screws 43 extend above the cross heads and are provided with a hand wheel 45 or with a squared end 46 adapted to receive a manually operated crank. These screws permit the vertical position of each tool holder in its supporting cross head to be continuously adjusted.

The tool holders may be provided with an adapter 47, one end of the adapter being received within the tool holder and the other end supporting in suitable bearings a tool roll 48, in the form of an idler roll having a working face of the desired contour. These adapters may assume a variety of forms to support the tool roll in the desired position with its axis at any desired angle in a vertical plane. Alternatively, the tool rolls may be supported directly by the tool holders. The tool rolls that are supported in the main cross heads A to D are adapted to have their axes in the same plane as the spindles axes and with their working faces opposed to that of a work roll on one of the spindles or to that of an adjacent tool roll, while the tool rolls supported by the auxiliary cross heads E to L are adapted to have their axes in a vertical plane spaced from that of the spindle axes.

In order that the position of the tool rolls may be more conveniently adjusted while material is running through the roll stand, all of the adjusting screws 15 and 23, which position the main and auxiliary cross heads, respectively, on their supporting members are made accessible from one side of the mill stand, preferably on the near side on which is mounted the hand wheel for adjusting the screwdowns of the upper spindle, where the operator would normally stand. The ends of the adjusting screws for positioning the near cross heads B, D, F, H, J, and L project from that side of the housing, but the ends of the adjusting screws for positioning the off cross heads A, C, E, G, I and K project from the off side of the stand. Accordingly, the end of each screw 15 on the off side of thte mill stand is provided with a sprocket 50, which is driven by a chain 51 from a second sprocket 52 on a stub shaft 53 rotatably supported on an arm 54 extending from the off side of the housing (see Fig. 6). The stub shaft 53 is provided with a square end 55 projecting towards the near side of the stand, so that it can be reached by an operator from that side and turned with a manual crank. On the exit side of each mill stand (to the right looking at Fig. 1), where there are two cross heads (for example, auxiliary cross heads E and I) supported on the off side of a single cross rail 20 or 21 and each cross head has a transverse adjusting screw 23 (see Figs. 4 and 5), the ends of those screws are secured respectively to sprockets 50a and 50b. These sprockets are each driven through separate chains 51a and 51b by other sprockets 52a and 52b on stub shafts 53a and 53b, respectively, rotatably mounted on a separate arm 54a. These stub shafts are also provided with square ends 55a and 55b, respectively, projecting through the arm 54a toward the near side of the stand for rotation by a manually operated crank. The arms 54a are removably secured to the cross rails 20 and 21 by any suitable means, such as bolts 56 (see Fig. 3), and arms 54 may be similarly secured to the housing 2.

The upper and lower spindles 7 and 6, respectively in each roll stand 1 are provided with keyways 60 for securing one or more work rolls against rotation on the spindle, each of which is adapted to be driven as hereinafter explained. These work rolls are slidably received on the spindles and their axial position thereon can be adjusted in the usual manner by retaining collars on each side of the rolls. The rolls are also removable by first freeing from the housing 2 the right hand ends (looking at Fig. 2) of each of the tie rods 58, cross members 11 and 12, and cross rails 20 and 21 extending transversely of the housings 2 and moving one of the housings, which is slidably supported on a bed 61, laterally a sufficient disance by means of a screw 62 (see Fig. 2) to permit one end of the spindles to clear the adjacent housing. Work rolls can then be put on or taken off of the spindles, after the near main cross head 14, with their integral yokes 13 (i. e., cross heads B and D), have been removed by withdrawing the yokes from the free ends of their supporting cross members 11 or 12.

The spindles of each roll stand have their own motor 63, and at least one spindle, and preferably both, are driven. In the latter case, both spindles are connected to the motor through a differential gear 64 and a gear reduction 65. This differential gear permits the work rolls on each spindle to engage the work and push it through the tool rolls, and at the same time permits the work engaging surfaces of the rolls to move at the same linear speed when using rolls of different diameters. This prevents the surface of the material from being scarred or otherwise marred by roll slippage that would otherwise occur if the rolls rotated at the same speed.

In some cases it is desirable that the axis of one of the work rolls be inclined at an angle to the horizontal. Such inclination is obtained by operating the screwdown on one housing without operating that on the other housing. To effect this result, each pinion 70 is slidably received on shaft 71, which is turned by the hand wheel 10 to operate the vertical screwdowns of each roll stand, so that each pinion can be disengaged from an intermeshing screwdown gear 72 (see Fig. 4) and slid along the shaft towards the center of the roll stand. When one pinion is so disengaged, rotation of the hand wheel will not operate the screwdown on that side of the mill but will operate the one on the other side so that the spindle is given the desired inclination. The upper spindle is accordingly supported in spherical or universal bearings that will permit the spindle to be inclined.

Figure 1:
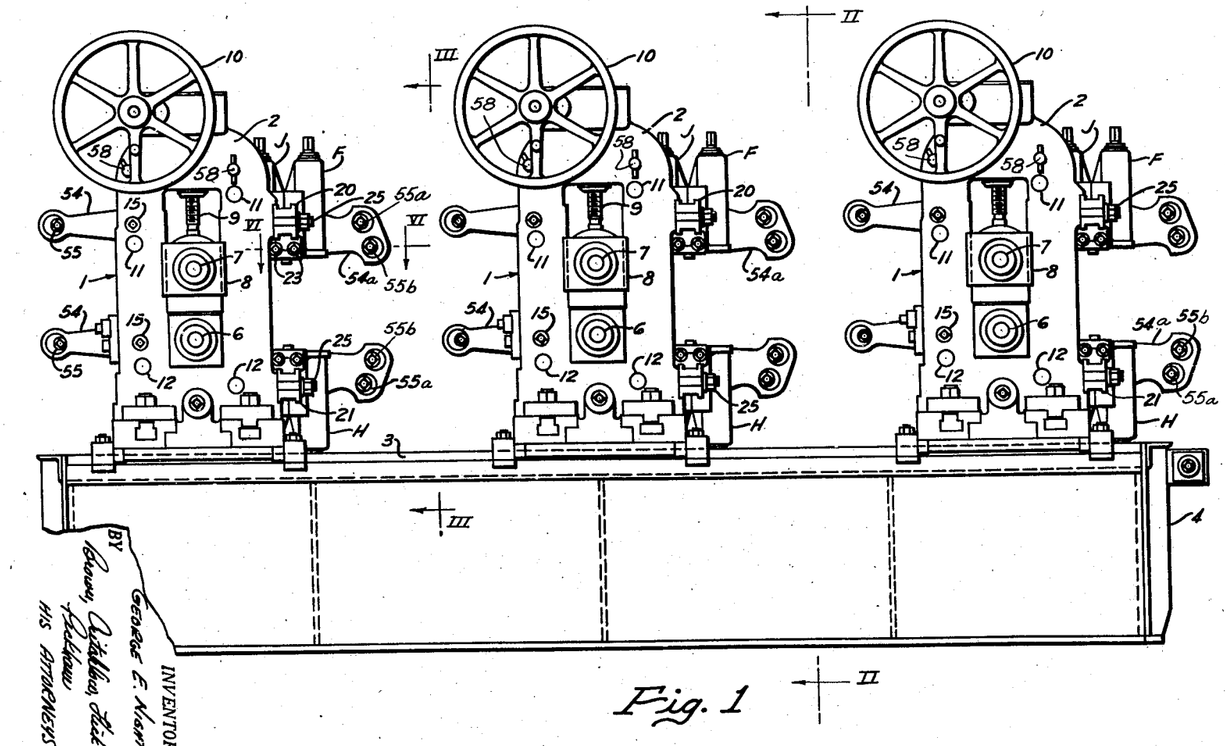
Fig. 1 is a side elevation of three roll stands arranged in tandem and embodying the present invention.
Figures 2, 6:
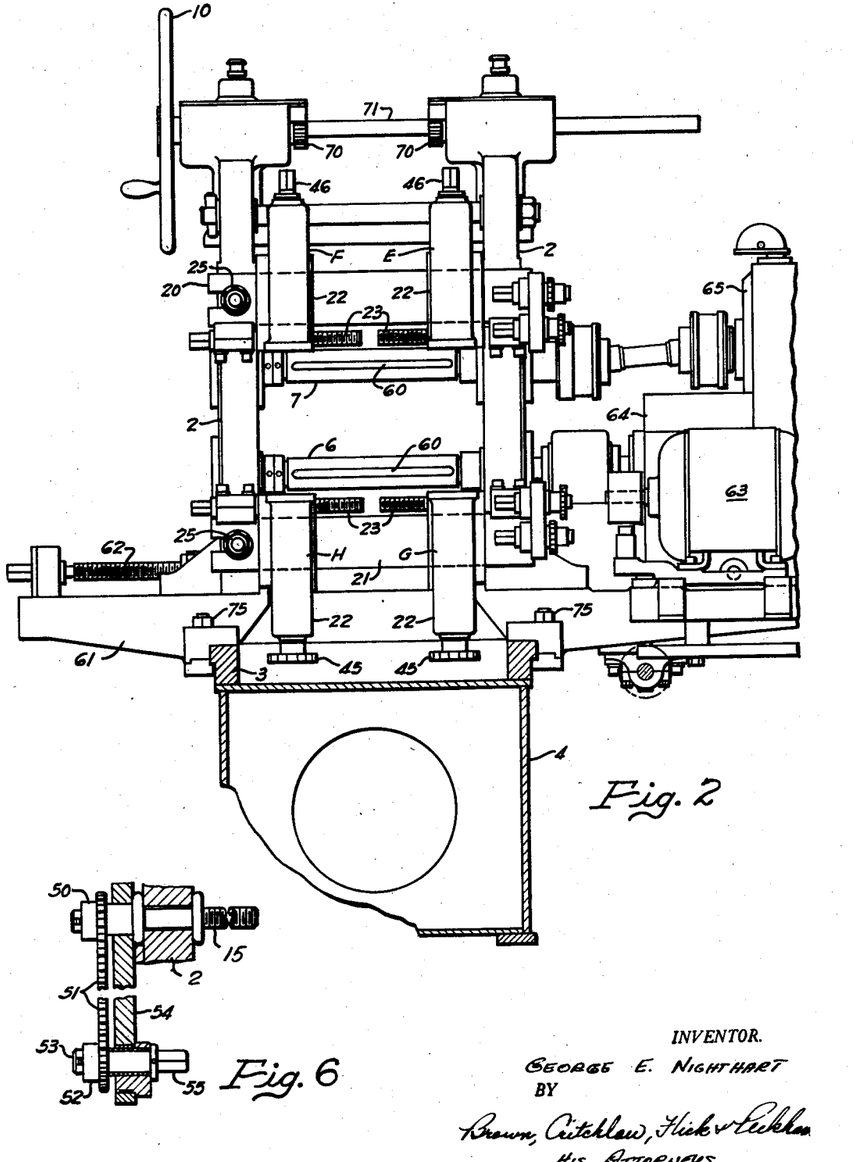
Fig. 2 is an end elevation of one of the roll stands along the line II—II of Fig. 1, with the tool holders and tools removed.
Fig. 6 is a plan view, partly in section, of the off-side adjusting means for positioning one of the off-side cross heads.
Figure 3:
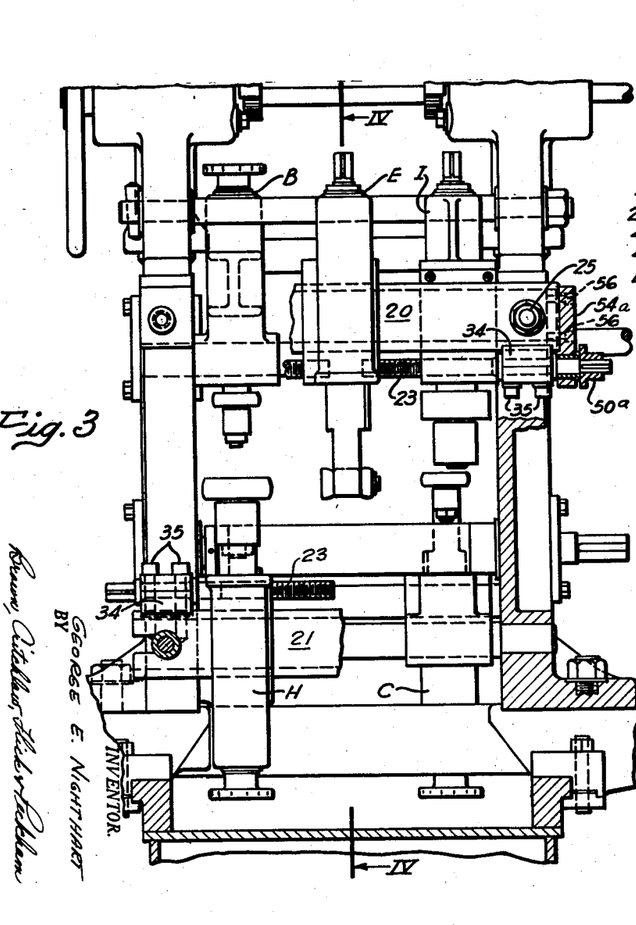
Fig. 3 is an end elevation of one of the roll stands, partly in section, along the line III—III of Fig. 1, with some of the tool holders and tools in place.

While a variety of sections may be correctly contoured in a single stand by the plurality of work rolls and tool rolls mounted thereon with their axes at the desired angle, it is frequently necessary to provide more than one such stand, through which the work passes in succession. Three stands are shown in Fig. 1, and will be found sufficient to take care of a large number of sections in one pass. The structure of each stand is identical with that described, although the roll arrangement for contouring a particular section will not generally be the same on each stand. For example, one stand may take care of distortions in a vertical plane, while a second stand takes care of those in a horizontal plane; and a third stand may be added to act independently with respect to portions of the section which may lie in a still different plane. Depending upon the slenderness ratio of the material being contoured, the distance between each roll stand may be varied by sliding the stands on the rails 3, and holding them in the desired position with clamp bolts 75. In handling very slender sections, it is desirable to keep these stands as close together as possible. With heavier sections, the stands can be moved apart, giving the operator more room for making adjustments on the various tool rolls and to determine the accuracy of those adjustments by means of templates held in contact with the material while it is passing through the stands.

It is sometimes desirable to provide guide rolls for the material at the entry side of the mill. Such a roll 76 is shown in Fig. 4, adjustably mounted on a cross member 77 secured to the housings.

Figure 7:
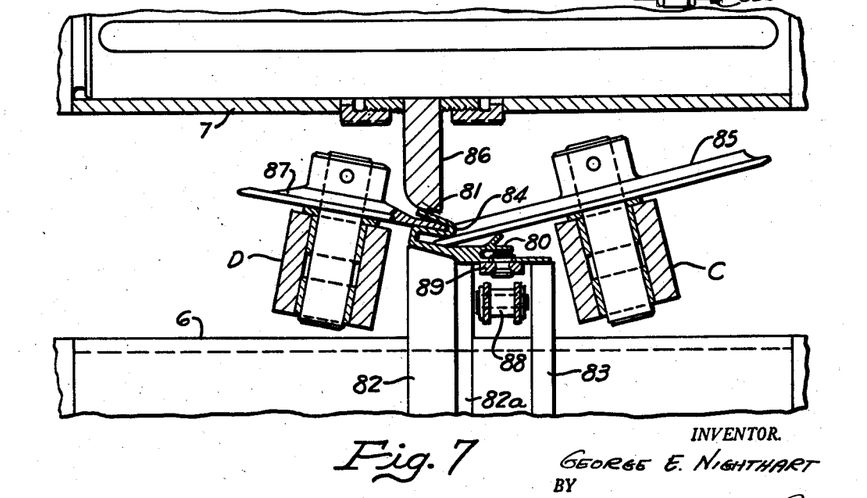
Figs. 7–13 are fragmentary illustrations of the tool setups for correcting the contour of various types of extruded shapes.

In Figs. 7 to 13 are shown various sections that have been either (1) initially rolled or extruded to a desired shape and have become deformed in subsequent handling or heat treating, or (2) due to die limitations have been extruded only to the approximately desired shape. Accompanying each of those sections is a fragmentary view of the roll setup for correcting the contour of that section. In Fig. 7, the section 80 is an automotive shape in which, due to die limitations, one side 81 of a U-shaped portion has been extruded, as shown by the broken lines in the drawings, with an outward flare. To correct this defect, i. e., to recontour the section, it is necessary to support the bottom of the section on a roll of conforming shape, or preferably on a group of general purpose rolls 82, 82a and 83 that will support the section at critical points. Those rolls are mounted on the lower spindle of one of the stands shown in Fig. 1. It is also necessary to support the section at the bottom 84 of the U-shaped flange to avoid introducing a new distortion in the work. This support is provided by a disc roll 85, with a contoured face that bears against the bottom of the U-shaped portion and also against an opposed portion of that section resting on the lower work rolls 82, 82a and 83. Roll 85 may be mounted on main cross head C, in an adapter that permits the axis of the roll to be inclined at the desired angle. The roll that actually corrects the distortion in the section and, in cooperation with the work rolls 82, 82a and 83, acts as a traction roll, is a general purpose work roll 86 mounted on the upper spindle of the roll stand. It bears against the tip of the flange that has been deformed. Since the distortion has created a hollowness in the flange itself, and is not confined to the bend 84 at the bottom of the U-shaped portion, it is necessary to provide the equivalent of a mandrel against which the mid-portion of the flange may be pressed. Such a mandrel or stop is provided by a general purpose disc roll 87 that may be mounted at the desired angle on main cross head D of the roll stand. It is usually desirable to set the forming roll, here the work roll 86, so that it will deform the material beyond the ultimate position desired to compensate for spring-back when the roll pressure is relieved. All of the rolls shown in Fig. 7 have their axes in the same vertical plane, and their working faces are opposed to each other and cooperate in that plane to recontour the work passed through the stand.

While the spindles and work rolls shown in Fig. 7 are driven, and act as traction rolls, the shape of section 80 is such that the traction of those rolls may be insufficient to force the material through the stand. In this, and in similar cases, the material is preferably pulled through the stand by a draw chain 88 that is attached to a draw bar 89, which is in turn secured to the leading end of the material being recontoured. The chain itself is preferably an endless chain passing over the bottom spindle of each roll stand and returning underneath those spindles. It may be driven by a driven sprocket (not shown) either mounted on one of the spindles, or mounted independently and separately driven. This draw chain is also used on other sectional shapes having a high slenderness ratio, where the use of traction rolls alone would tend to buckle the material in forcing it through the tool rolls supported by the auxiliary cross heads.

Figure 8:
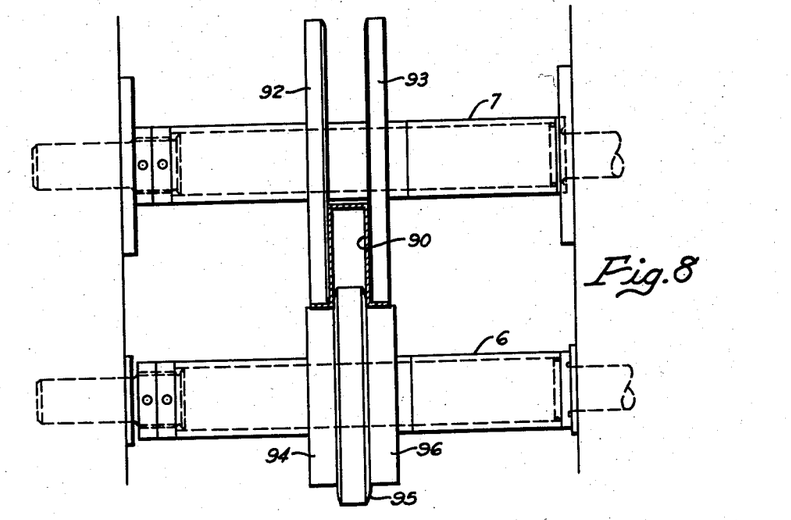
Figure 9:
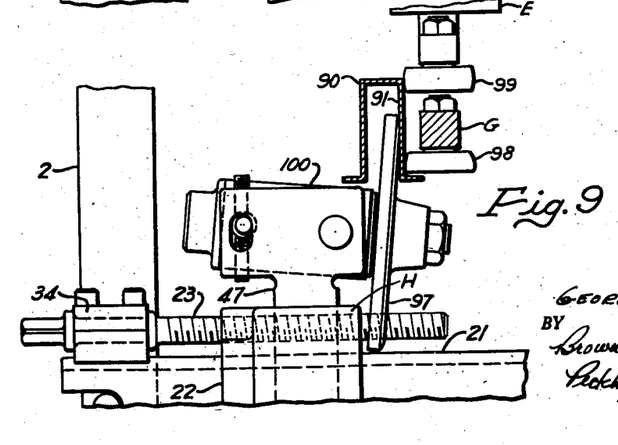

In Figs. 8 and 9 is shown what is known as a hat section 90, in which one of the side walls 91 is defective because of an outward flare. To correct the contour of this section the work is gripped (as shown in Fig. 8) between work rolls 92 and 93 on the upper spindle, and work rolls 94, 95 and 96 on the lower spindle. The work rolls in this case act merely as traction rolls and do not deform the material. As it leaves the traction rolls (see Fig. 9), the work passes between three idler tool rolls 97, 98 and 99 supported by three auxiliary cross heads, for example, cross heads H, G and E, respectively (other combinations of three of the eight auxiliary cross heads can also be provided). Auxiliary cross head H supports a tool adapter 100, by which the angle of the disc roll 97 mounted therein can be varied. This roll engages at a slight angle the mid-point of the inside of the deformed side 91 of section 90. The top and bottom corners of that side are supported externally by rolls 98 and 99. Pressure is applied by the lower of those rolls 98 to bend the bottom end of the section inwards against the disc roll 97, which in this case acts as a mandrel. The inward bending imparted to the lower end of this section is slightly greater than the ultimate bending desired to take care of the natural springback of the material.

Figure 10:
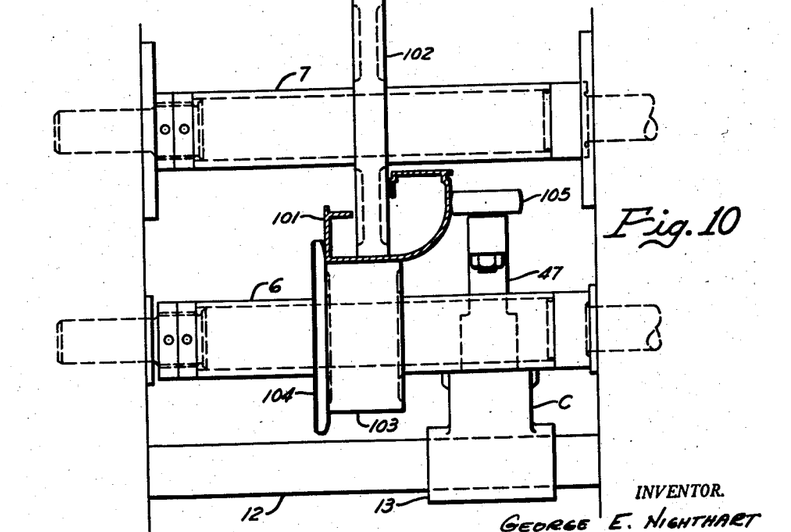

In Figs. 10–13, the section 101 is again an automotive shape, in which a variety of deformations are variously corrected. In Fig. 10, the section is shown engaged between work rolls 102 and 103 mounted on the upper and lower spindles, respectively. The lower work roll 103 has a flange 104 on one side to prevent lateral movement of the work in that direction. A lateral stop against movement in the other direction is provided by an idler roll 105 supported in main cross head C. Here, the work roll 102 on the upper spindle is of larger diameter than the work roll 103 mounted on the lower spindle. If each work roll were rotated at the same speed there would be slippage on the work and its surface would be marred. However, due to the differential gearing in the spindle drives, which has already been described, the upper roll will rotate more slowly than the lower roll but at the same peripheral speed at its working face. The rolls in Fig. 10 merely act as guide and traction rolls.

Figure 11:
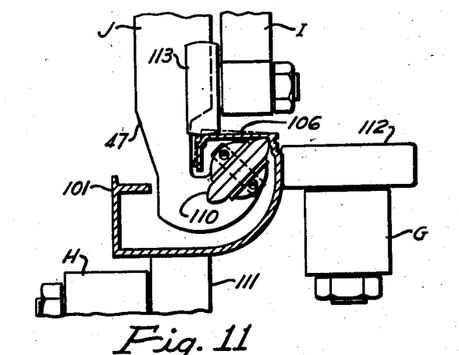

In Fig. 11 is shown the tool arrangement supported by the auxiliary cross heads for removing an outward flare in the upper side 106 of the same section 101. The traction rolls of Fig. 10 deliver the material to a combination of four rolls 110, 111, 112, and 113 supported, respectively, by cross heads J, H, G and I. The first three of those rolls support and guide the work, while roll 113 acts as the deforming roll pressing the top side 106 down to obtain the correct contour. Roll 110 is held in a special tool holder in cross head J and also acts as a mandrel roll to confine the bending action of roll 113 to the portion 106 of the section.

Figure 12:
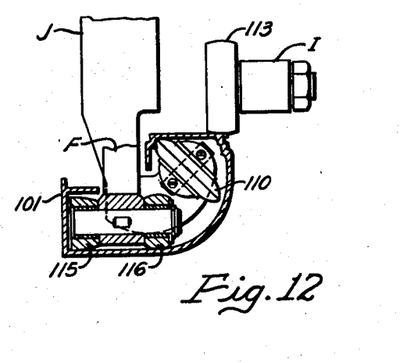

In Fig. 12, this same flange of this same section is shown with an inward bow that is corrected by a slightly different tool setup. Here the deforming pressure applied by the angled roll 110 on cross head J is in an upward direction, and roll 113 on cross head I and twin rolls 115 and 116 on cross head F hold the work down. The deforming roll 110 is the same roll, supported by the same cross head J, as in Fig. 11, with the exception that the axis of the roll has been turned 90° in its adapter.

Figure 13:
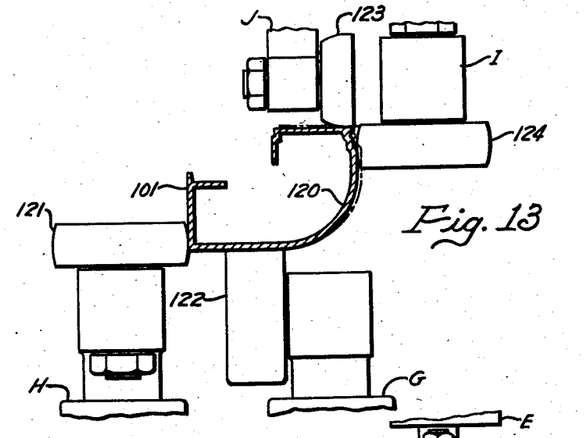

In Fig. 13, the defect in this same section is the inadequate curvature of its cylindrical portion 120. To correct this, the section is supported by rolls 121 and 122 mounted, respectively, in cross heads H and G. Rolls 123 and 124 mounted on cross heads J and I, respectively, both act as deforming rolls to correct the contour of the section.

In the last four figures discussed, the material was driven in each case through the tool rolls supported in the auxiliary cross heads by the traction rolls on the upper and lower spindles. If the section there illustrated had all of the defects illustrated in each of Figs. 11–13, they could be removed either by three successive passes through the same stand, in which the roll setup of the auxiliary cross heads would be changed for each pass, or by using the three stand assembly illustrated in Fig. 1, in which each distortion is successively removed in a different stand with consequent saving of time. In using two or more stands, it is generally desirable to guide and feed the material with traction rolls mounted on the spindles of each stand.

It will be clear from the foregoing description of the apparatus and its mode of operation in contouring certain exemplary sections, that the present invention provides apparatus of great inherent flexibility, which will handle a large variety of sectional shapes with a minimum amount of tools. Because of the number of cross heads supporting the tool rolls, the possible permutations in their arrangement, and the adaptability of the rolls themselves to be supported with their axes at the desired inclination, it is possible to concentrate a large number of tool operations at a given point. Because of this inherent flexibility, a number of contouring or recontouring operations can be performed on differently shaped sections by using only a minimum number of special tool rolls, which is of considerable advantage in production. In other words, rather than using rolls specifically contoured to fit a specific section perfectly, and of no use in contouring other sections, this invention permits the use of standardized rolls to support or deform the work piece only at critical points. Those points can be sufficiently numerous, because of the availability of a number of tools for cooperating on the work piece in the same plane, to assure adequate support and pressure where it is required. The work is not deformed except where deformation is desired, and then only to the extent necessary, with allowance for springback, to bring the shape to its desired conformation. In addition, the apparatus of this invention permits the continuous adjustment of the various tools while the apparatus is in operation, thereby assuring correct contouring with the least possible delay and waste.

When contouring slender sections, which because of their small size may provide insufficient space for the use of the idler tool rolls, it may be desirable to use dies supported by the tool holders in place of the tool rolls. In such cases, the material would generally be pulled through the dies by the draw chain 88 and draw bar 89, attached to the leading end of the material.

In some cases, it may be desirable to have all of the cross heads and their adjusting mechanisms on the exit side of the mill, so that the operator can more easily adjust the position of the various tools. I prefer to do so by the modifications illustrated in Figs. 14–16. As will be apparent, these modifications permit easier assembly and removal of the affected tool holders and cross heads and reduce the number of parts required in the completed structure, as well as providing for easier operation.

Figure 14:
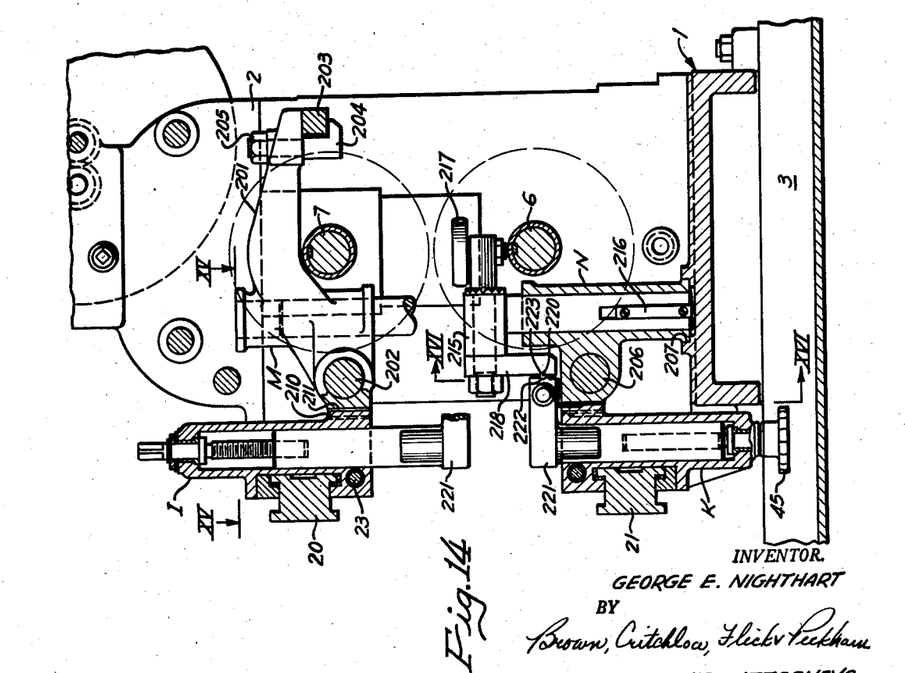
Fig. 14 is a side elevation, partly in section, of a modification of the roll stand shown in Fig. 4.

In Fig. 14, an upper main cross head M (corresponding to main cross head B in Fig. 4) is mounted on the exit side of the mill on a yoke 201, which is slidably mounted on transverse bars 202 and 203 secured to the mill housings. For convenience in removing the yoke 201, the front bar 203 has a square cross section and the front end of the yoke is slidably held thereon by a hold-down finger 204 and its adjusting nut 205. This construction permits the finger to be loosened and swiveled to release that end of the yoke from the bar. A lower main cross head N (corresponding to cross head D in Fig. 4) is slidably mounted on a transverse bar 206; and, to give it additional stability, its lower end slides in a machined slot 207 extending transversely of the base. It will be understood, without further illustration in the drawings, that additional main cross heads (corresponding to cross heads A and C in Fig. 4) can be similarly mounted on these cross rails.

Figure 15:
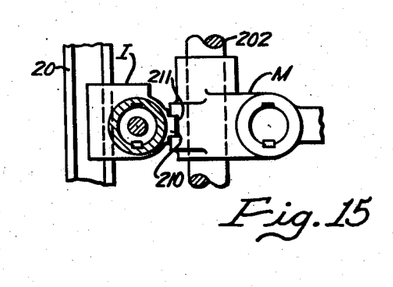
Fig. 15 is a plan view, partly in section, of two upper engaging cross heads taken along the line XV—XV of Fig. 14.
Figure 16:
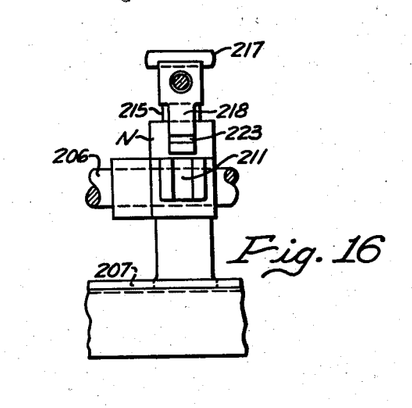
Fig. 16 is an end elevation of the inner lower cross head, and its supported tool, shown in Fig. 14.

The main cross heads in the modified roll stand are adjusted horizontally on their cross rails by adjusting the adjacent auxiliary cross heads. Referring to Figs. 14–16, auxiliary cross head I is provided on its inner side with a vertically extending tongue 210 which is adapted to engage a slot or groove 211 on the outer side of the adjacent main cross head M. It will be apparent that the latter can then be moved horizontally on its cross rails when the auxiliary cross head I is moved on cross rail 20 by the adjusting screw 23, as previously described. Similarly, the lower main cross head N is adjusted horizontally by moving auxiliary cross head k which is adjacent to and engages cross head N. In this way, one or more of the main cross heads may be removably linked with a corresponding auxiliary cross head.

In addition to controlling the lateral position of the main cross heads, the adjacent and linked auxiliary cross heads are also used to effect vertical adjustment of the tool holders mounted in the main cross heads. This is illustrated in connection with cross heads K and N in Figs. 14 and 16. A tool holder 215 is mounted in cross head N (and on the other main cross heads) for slidable vertical movement therein, rotation of the tool holder being prevented by the key 216, which engages a corresponding slot on the inner wall of the cross head. Adjustably mounted on the inner end of this tool holder is a tool 217 in the form of an idler roll, similar to the idler rolls previously described. On the opposite, or outer, end of tool holder 215, there is secured a downwardly extending link 218, which is connected by a shear pin 220 to a tool holder 221 adjustably mounted in the adjacent auxiliary cross head K. Tool holder 221 is similar to tool holder 47, previously described in connection with Fig. 4, except that its end is provided with an arcuate recess 222, matching a similar recess 223 in the link 218, for slidably receiving the shear pin 220. Tool holder 221, in other words, acts as an adjusting member for varying the height of tool holder 215 in the main cross head, and consequently the vertical position of the tool 217 can be adjusted upward or downward by the hand screw 45 on auxiliary cross head K. It will be apparent that the tool holder or adjusting member 221 and tool holder 215 can be quickly disconnected from each other by removing the shear pin 220. To prevent its accidental removal, the ends of the pin may be provided with lock nuts or other retaining means (not shown).

It is among the advantages of the modified apparatus described above that the tools supported by the main cross heads may be adjusted vertically and horizontally through the adjusting mechanisms provided for the adjacent auxiliary cross heads and the tool holders supported therein, so that all of the adjusting mechanisms are on the exit side of the mill within easy reach of the operator. This permits easier adjustment of the various tools both before and during the operation of the apparatus. It is a further advantage that separate adjusting mechanisms for the main cross heads and their supported tool holders have been eliminated. In addition, the main and auxiliary cross heads can be readily disconnected, and the latter can be used independently with the tool holder 221 to support tools for forming the work piece, as previously described herein.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for correcting the contour of and for recontouring previously shaped metal stock, comprising a roll stand having a pair of housings, a pair of roll spindles journaled in the housings and extending therebetween, each spindle being adapted to have adjustably and removably mounted thereon at least one working roll, means for driving at least one of the spindles, a plurality of horizontal cross members extending transversely between the housings, a plurality of vertically extending cross heads slidably mounted on each cross member, separate means for continuously adjusting the horizontal position of each cross head on its supporting cross member, a separate tool holder detachably and slidably mounted on each cross head, separate means for continuously adjusting the vertical position of each tool holder in its supporting cross head, and an idler roll detachably mounted on each tool holder, at least two of the cross heads being positioned adjacent a roll spindle with their supported idler rolls having their axes in substantially the same vertical plane as the spindle axes, and at least two of the cross heads being positioned on the delivery side of the roll stand with their supported idler rolls adapted to oppose each other and with their axes in a vertical plane parallel to the plane of the spindle axes.

2. Apparatus in accordance with claim 1, in which one of the cross members extends transversely between the housings on the delivery side of the roll stand.

3. Apparatus in accordance with claim 1, in which there are two cross members secured to the housings on the delivery side of the stand and two cross members secured to the housings adjacent the roll spindles, the idler rolls supported by the last mentioned cross members having their axes lying in substantially the same plane as the roll spindles.

4. Apparatus in accordance with claim 1, in which both of the spindles are driven through a differential gear.

5. Apparatus for correcting the contour of and for recontouring previously shaped metal stock, comprising a roll stand having a pair of housings, a pair of roll spindles journaled in the housings and extending therebetween and defining a pass area between them, each spindle being adapted to have adjustably and removably mounted thereon at least one working roll, means for driving at least one of the spindles, two cross members extending transversely between the housings adjacent a spindle and with one cross member above and the other below the pass area, at least one main cross head adapted to be slidably and adjustably mounted on each cross member, a tool holder detachably and slidably mounted in each of the main cross heads and extending vertically therefrom in the direction of the pass area, an idler roll detachably mounted on each of the tool holders and supported thereby in the pass area with its axis in the same vertical plane as the spindle axes, two cross rails extending transversely between the housings on the delivery side thereof with one cross rail below and the other above the pass area, a plurality of auxiliary cross heads slidably and adjustably mounted on each of the cross rails, a tool holder detachably and slidably received in each auxiliary cross head and extending vertically therefrom in the direction of the pass area, an auxiliary idler roll detachably mounted on each auxiliary tool holder, the axes of the auxiliary idler rolls lying in substantially the same vertical plane, and separate screw means for continuously adjusting the horizontal position of each cross head on its supporting member and the vertical position of each tool holder in its supporting cross head.

6. Apparatus in accordance with claim 5, in which each of the cross members supporting the main cross heads includes two spaced parallel bars on opposite sides of one of the roll spindles and a yoke, on which a main cross head is supported, slidably mounted on each pair of bars.

7. Apparatus in accordance with claim 5, in which each cross rail has mounted thereon four auxiliary cross heads, each of which is adapted to travel substantially one half of the length of the cross rail.

8. Apparatus in accordance with claim 7, in which not more than one half of the cross sectional area of each cross rail is embraced by each cross head, thereby providing sufficient clearance for two adjacent cross heads to pass each other when adjusting them along the cross rail.

9. Apparatus in accordance with claim 5, in which each of the screw means for adjusting the horizontal position of the cross heads extends substantially one half the length of the supporting cross member or cross rail and threadably engages one of the cross heads and has one end projecting beyond a side of the roll stand.

10. Apparatus in accordance with claim 9 that contains the following additional elements: a sprocket secured to the end of each screw means on one side of the roll stand, a rigid supporting arm extending from the roll stand adjacent the sprocket and at right angles to the screw means, a second sprocket rotatably mounted on the outer end of the arm in a plane parallel to the first sprocket, an endless chain engaging both sprockets, a stub shaft secured to the second sprocket and extending through the arm towards the other side of the roll stand for adjusting the screw means from said other side.

11. Apparatus for correcting the contour of and for recontouring previously shaped metal stock, comprising a pair of parallel supporting rails, a plurality of roll stands slidably mounted on the rails in tandem so that the distance between stands may be varied, each stand having a pair of housings, a pair of roll spindles journaled in the housings and extending therebetween, each spindle being adapted to have adjustably and removably mounted thereon at least one working roll, means for driving at least one of the spindles, a plurality of horizontal cross members extending transversely between the housings, a plurality of vertically extending cross heads slidably mounted on each cross member, separate means for continuously adjusting the horizontal position of each cross head on its supporting cross member, a separate tool holder detachably and slidably mounted on each cross head, separate means for continuously adjusting the vertical position of each tool holder in its supporting cross head, an idler roll detachably mounted on each tool holder, at least two of the cross heads being positioned adjacent a roll spindle with their supported idler rolls having their axes in the same vertical plane as the spindle axes, and at least two of the cross heads being positioned on the delivery side of the roll stand with their supported idler rolls adapted to oppose each other and with their axes in a vertical plane parallel to the plane of the spindle axes.

12. Apparatus for correcting the contour of and for recontouring previously shaped metal stock, comprising a roll stand having a pair of housings, a pair of roll spindles journaled in the housings and extending therebetween and defining a pass area between them, each spindle being adapted to have adjustably and removably mounted thereon at least one working roll, means for driving at least one of the spindles, a cross member extending transversely between the housings adjacent a spindle, a main cross head slidably mounted on the cross member and disposed on the delivery side of the spindles, a tool holder slidably supported in the main cross head and extending vertically therefrom in the direction of the pass area, a tool mounted on the tool holder and supported thereby in the pass area with its axis in substantially the same vertical plane as the spindle axes, a cross rail extending transversely between the housings parallel to and outside of the cross member, an auxiliary cross head slidably and adjustably mounted on the cross rail, means connecting the main and auxiliary cross heads for conjoint horizontal movement on their respective supports, means for continuously adjusting the horizontal position of one of those cross heads on its support, an adjusting member slidably received in the auxiliary cross head and extending vertically therefrom and also toward the tool holder, means for detachably connecting the adjusting member and the tool holder, and means for continuously adjusting the vertical position of the adjusting member in its supporting cross head and thereby at the same time adjusting the vertical position of the tool holder in its supporting cross head.

13. Apparatus according to claim 12, in which the means connecting the main and auxiliary cross heads comprises a tongue and groove engagement between those elements.

14. Apparatus according to claim 12, in which the means for connecting the adjusting member and the tool holder comprises a vertical face on the member adjacent to and opposing a vertical face on the holder, a horizontally extending recess in each face, and a single shear pin slidably received in both recesses to connect said adjusting member and tool holder for conjoint vertical movement.

References Cited in the file of this patent

UNITED STATES PATENTS

| | | |
|---|---|---|
| 188,741 | Kloman | Mar. 27, 1877 |
| 252,523 | Sandberg | Jan. 17, 1882 |
| 425,951 | Marble | Apr. 15, 1890 |
| 718,476 | King | Jan. 13, 1903 |
| 1,080,651 | Noll | Dec. 9, 1913 |
| 1,673,787 | Frahm | June 12, 1928 |
| 1,736,331 | Townsend | Nov. 19, 1929 |
| 2,012,795 | Park | Aug. 27, 1935 |
| 2,150,202 | Blevins | Mar. 14, 1939 |
| 2,251,967 | Yoder | Aug. 12, 1941 |
| 2,405,128 | Berquist | Aug. 6, 1946 |
| 2,708,511 | Wilson | May 17, 1955 |